(12) United States Patent
Tillman et al.

(10) Patent No.: US 9,909,530 B2
(45) Date of Patent: Mar. 6, 2018

(54) NON-AXISYMMETRIC FIXED OR VARIABLE FAN NOZZLE FOR BOUNDARY LAYER INGESTION PROPULSION

(71) Applicant: UNITED TECHNOLOGIES CORPORATION, Hartford, CT (US)

(72) Inventors: Thomas G Tillman, West Hartford, CT (US); Wesley K. Lord, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 430 days.

(21) Appl. No.: 14/295,566

(22) Filed: Jun. 4, 2014

(65) Prior Publication Data
US 2015/0226156 A1 Aug. 13, 2015

Related U.S. Application Data

(60) Provisional application No. 61/862,173, filed on Aug. 5, 2013.

(51) Int. Cl.
| | |
|---|---|
| *F02K 1/52* | (2006.01) |
| *B64D 29/04* | (2006.01) |
| *F02K 1/12* | (2006.01) |
| *F02K 3/06* | (2006.01) |
| *F02K 1/00* | (2006.01) |

(52) U.S. Cl.
CPC ............... *F02K 1/52* (2013.01); *B64D 29/04* (2013.01); *F02K 1/002* (2013.01); *F02K 1/12* (2013.01); *F02K 3/06* (2013.01); *F05D 2220/36* (2013.01); *F05D 2250/73* (2013.01)

(58) Field of Classification Search
CPC ... F02K 1/002; F02K 1/12; F02K 1/52; F02K 3/06; F05D 2220/36; F05D 2250/73; B64D 2033/0226; B64D 29/04
See application file for complete search history.

(56) References Cited

U.S. PATENT DOCUMENTS

| | | | | |
|---|---|---|---|---|
| 3,704,828 A | * | 12/1972 | Studer | F02K 1/006 239/265.19 |
| 4,000,868 A | * | 1/1977 | Gregor | B64C 3/44 244/12.5 |
| 4,066,214 A | * | 1/1978 | Johnson | B64D 33/04 239/265.19 |
| 4,449,678 A | | 5/1984 | Hapke | |
| 5,782,431 A | * | 7/1998 | Gal-Or | F02K 1/002 239/265.11 |
| 7,798,423 B1 | | 9/2010 | Shmilovich et al. | |
| 2010/0050651 A1 | | 3/2010 | Dindar et al. | |
| 2011/0155862 A1 | | 6/2011 | Mengle | |

OTHER PUBLICATIONS

Hall, C.A., and Crichton, D., "Engine Design Studies for a Silent Aircraft", Journal of Turbomachinery, vol. 129, Jul. 2007, pp. 479-487.*

(Continued)

*Primary Examiner* — Lorne Meade
(74) *Attorney, Agent, or Firm* — Bachman & LaPointe, P.C.

(57) ABSTRACT

A fan section for an engine has a fan which rotates about an axis, the fan has an inlet for ingesting ambient air, and a non-axisymmetric nozzle for providing the fan with non-uniform back pressure.

8 Claims, 2 Drawing Sheets

(56) References Cited

OTHER PUBLICATIONS

Dolph, Greg, "Perfect Vision", General Aviation, Apr. 2009, pp. 26-29.*

Hileman, J., Reynolds, T., de la Rosa Blanco, E., Law, T., and Thomas, S., "Development of Approach Procedures for Silent Aircraft", AIAA-2007-451, 45th AIAA Aerospace Sciences Meeting and Exhibit, Reno, NV, Jan. 8-11, 2007, pp. 1-14.*

Robinson, T., "Second Sight: Optica Seeks 21st Century Reboot", AeroSpace, vol. 43, No. 3, Mar. 2016, pp. 14-17.*

* cited by examiner

US 9,909,530 B2

NON-AXISYMMETRIC FIXED OR VARIABLE FAN NOZZLE FOR BOUNDARY LAYER INGESTION PROPULSION

CROSS REFERENCE TO RELATED APPLICATION

This application claims the benefit of provisional application Ser. No 61/862,173, filed Aug. 5, 2013.

U.S. GOVERNMENT RIGHTS

The invention was made with U.S. Government support under contract NNC07CB95C awarded by the NASA. The U.S. Government has certain rights in the invention.

BACKGROUND

The present disclosure relates to a non-axisymmetric fixed or variable fan nozzle for a fan section of a gas turbine engine.

Conventional fan nozzles, corresponding to clean inflow fans, are axi-symmetric—that is they are symmetric around the fan rotation axis. For boundary layer ingestion propulsion systems, ingested boundary layer flow from an airframe creates a velocity and total pressure distortion locally in the region of the fan adjacent to the airframe. This distortion has little distance in which to mix or otherwise re-distribute within the inlet between the highlight and the fan face. Further, this distortion presents challenges to fan performance, aeromechanics, and operability. It is desirable to overcome these issues and reduce the adverse impacts of boundary layer ingestion on the fan component of a gas turbine system.

SUMMARY

In accordance with the present disclosure, there is provided a fan section for an engine which broadly comprises a fan which rotates about an axis, which fan has an inlet for ingesting ambient air, and a non-axisymmetric nozzle for providing the fan with non-uniform back pressure.

In a further embodiment, the fan section may additionally and/or alternatively employ the non-axisymmetric nozzle having a first fan nozzle area which is more closed at a first portion of said fan nozzle and a second fan nozzle area which is more open at a second portion of said fan nozzle.

In a further embodiment of any of the foregoing embodiments, the first portion may additionally and/or alternatively be a top portion of said fan nozzle and the second portion may additionally or alternatively be a bottom portion of said fan nozzle.

In a further embodiment of any of the foregoing embodiments, the first fan nozzle area may additionally and/or alternatively be formed by at least one first flap and the second fan nozzle area may be formed by at least one second flap.

In a further embodiment of any of the foregoing embodiments, each first flap may additionally and/or alternatively have a camber from a leading edge to a trailing edge which curves toward said axis.

In a further embodiment of any of the foregoing embodiments, each first flap may additionally and/or alternatively be fixed.

In a further embodiment of any of the foregoing embodiments, each first flap may additionally and/or alternatively be movable.

In a further embodiment of any of the foregoing embodiments, each second flap may additionally and/or alternatively have a camber from a leading edge to a trailing edge which curves away from said axis.

In a further embodiment of any of the foregoing embodiments, each second flap may additionally and/or alternatively be fixed.

In a further embodiment of any of the foregoing embodiments, each second flap may additionally and/or alternatively be movable.

In a further embodiment of any of the foregoing embodiments, the at least one first flap may additionally and/or alternatively comprise a plurality of circumferential flaps and the at least one second flap may alternatively and/or additionally comprise a plurality of circumferential flaps.

In a further embodiment of any of the foregoing embodiments, the circumferential flaps forming the at least one first flap and the at least one second flap may additionally and/or alternatively be non-uniformly actuable to achieve the first nozzle area and the second nozzle area, respectively.

In a further embodiment of any of the foregoing embodiments, the fan section further may additionally and/or alternatively comprise the inlet being formed by a nacelle surrounding at least a portion of the fan and a surface.

In a further embodiment of any of the foregoing embodiments, each first flap may additionally and/or alternatively be attached to a rear portion of the nacelle and each second flap may additionally and/or alternatively be attached to a rear portion of the surface.

In a further embodiment of any of the foregoing embodiments, the first portion may additionally and/or alternatively be a top portion of said fan nozzle and the second portion may additionally and/or alternatively be a bottom portion of said fan nozzle.

In a further embodiment of any of the foregoing embodiments, the fan section may additionally and/or alternatively be a part of an aircraft.

In a further embodiment of any of the foregoing embodiments, the surface may additionally and/or alternatively be adjacent to, or part of, a tail section of the aircraft.

Other details of the non-axisymmetric fixed or variable fan nozzle for boundary layer ingestion propulsion are set forth in the following detailed description and the accompanying drawings wherein like reference numerals depict like elements.

DETAILED DESCRIPTION

It has been discovered that one means for enhancing the re-distribution of pressure distortion caused by boundary layer ingestion is to present the fan with a non-uniform back pressure. This can be accomplished using a fixed or variable non-axisymmetric fan nozzle downstream of the fan. By using a fixed or variable non-axisymmetric fan nozzle, one can increase fan nozzle area locally in the circumferential location of the distortion. This has the effect of pulling more flow through the fan, filling in and re-distributing the distortion and resulting in a more uniform flow at the fan face.

Figure 1:
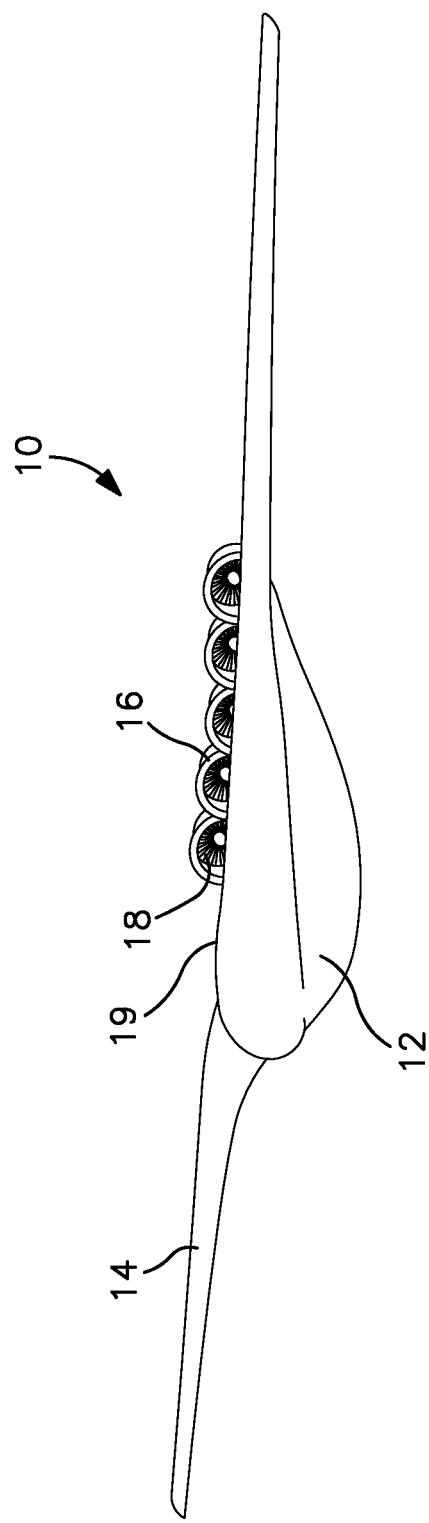
FIG. 1 is a perspective view of an aircraft having a propulsion system which includes a plurality of engines with a plurality of fan sections.

The fixed or variable non-axisymmetric fan nozzle described herein may be used with a wide variety of propulsion systems and gas turbine engines used with a wide variety of aircraft. One such aircraft on which the fan nozzle can be used is shown in FIG. 1. As shown therein, the aircraft 10 has a fuselage 12 and wings 14. The aircraft has a propulsion system formed by a plurality of engines 16. Each of the engines 16 may be a gas turbine engine. Further, each of the engines 16 has a fan section 18 which is at least partially embedded within a tail section 19 of the fuselage 12.

Figure 2:
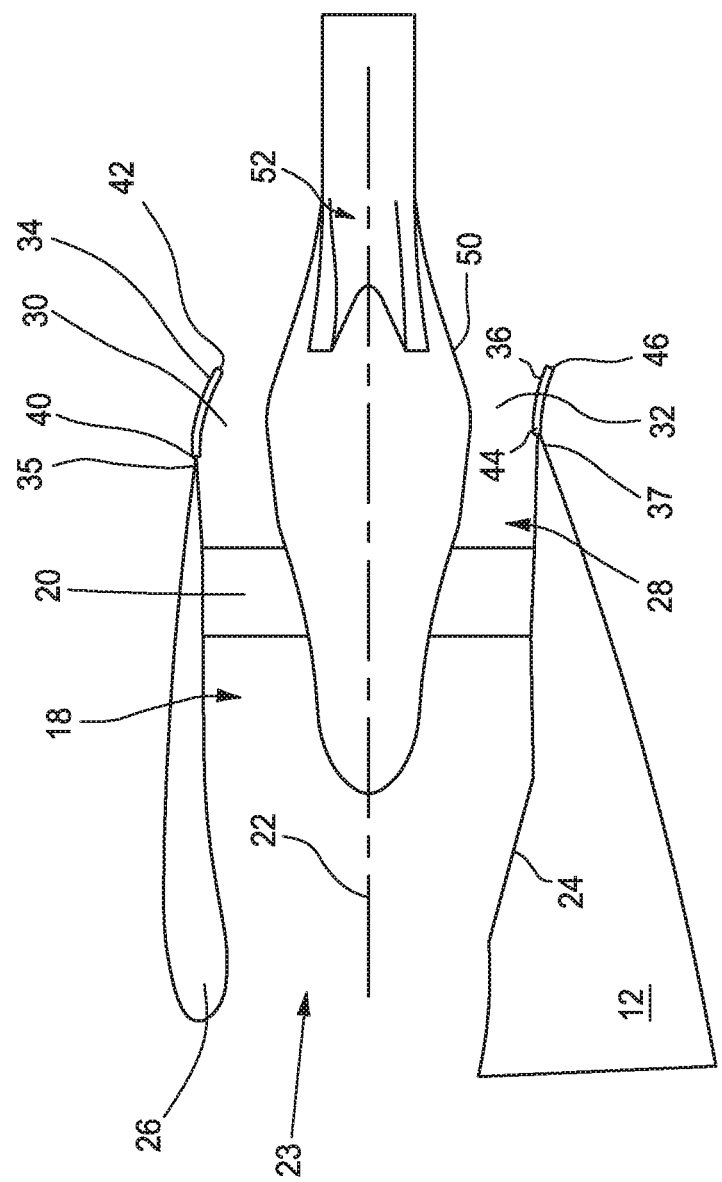
FIG. 2 is a sectional view of a fan section in accordance with the present disclosure.

Referring now to FIG. 2, there is shown a fan section 18. The fan section 18 has a fan 20 which rotates about a longitudinal rotational axis 22. The fan section 18 has an inlet 23 which is formed by a surface 24 of the fuselage 12 and a surrounding cowling or fan nacelle 26. The fan section 18 also has an exit nozzle 28. The surface 24 may be adjacent to, or part of, the tail section 19 of the fuselage 12. A core nacelle 50 extends along and around said longitudinal rotational axis 22 from said fan 20 to a core nozzle 52.

As shown in FIG. 2, the exit nozzle 28 is formed so as to have a fan nozzle area 30 which is more closed at the top and a fan nozzle area 32 which is more open at the bottom. The fan nozzle area 30 is defined between a top surface of the core nacelle 50 and a fixed or movable flap 34 which is attached to or incorporated into the rear 35 of the cowling or fan nacelle 26. The fan nozzle area 32 is defined between a bottom surface of the core nacelle 50 and a fixed or movable flap 36 which is attached to or incorporated into a rear portion 37 of the fuselage surface 24. As can be seen from FIG. 2, the nozzle areas 30 and 32 are non-axisymmetric with respect to the longitudinal rotational axis 22.

The flap 34 at the top of the fan nozzle area 30 may be provided with a camber that is curved towards the fan rotation axis 22 as one moves from the leading edge 40 of the flap 34 to the trailing edge 42 of the flap 34. The flap 36 at the bottom of the fan nozzle area 32 may be provided with a camber that is curved away from the fan rotation axis 22 as one moves from the leading edge 44 of the flap 36 to the trailing edge 46 of the flap 36. As shown in FIG. 2, the core exhaust nozzle 52 is located downstream of both the trailing edge 42 of the flap 34 and the trailing edge 46 of the flap 36 along said longitudinal rotational axis 22. The downstream direction is the direction of fluid flow from the inlet 23 to the exit nozzle 28 and/or to the core exhaust nozzle 52.

If desired, the flaps 34 and 36 may comprise a plurality of circumferential flaps, which are actuated non-uniformly. Such flaps may be used to achieve different fan nozzle areas locally at the top and the bottom.

When the flaps 34 and 36 are made to be movable, any suitable actuator (not shown) may be used to move the flaps 34 and 36 as desired to create the different fan nozzle areas 30 and 32 locally at the top and the bottom of the fan nozzle 26.

Advantages associated with the non-axisymmetric fixed or variable fan nozzles described above include fuel burn reductions and increases in propulsive efficiency.

There has been provided a non-axisymmetric fixed or variable fan nozzle for boundary layer ingestion propulsion. While the non-axisymmetric fixed or variable fan nozzle has been described in the context of specific embodiments thereof, other unforeseen variations, modifications, and alternatives may become apparent to those skilled in the art having read the foregoing description. Accordingly, it is intended to embrace those alternatives, modifications and variations as fall within the broad scope of the appended claims.

What is claimed is:

1. A fan section for an aircraft engine comprising:
a fan which rotates around a longitudinal rotational axis of said aircraft engine;
said fan having an inlet for ingesting ambient air, said inlet being formed by a fan nacelle surrounding at least a portion of said fan and said inlet being formed by a surface of a fuselage surrounding a remaining portion of said fan;
a core exhaust nozzle coaxial with said longitudinal rotational axis, said core exhaust nozzle located downstream of said fan;
a core nacelle extending along and around said longitudinal rotational axis from said fan to said core exhaust nozzle; and
a non-axisymmetric fan nozzle of the fan nacelle, said non-axisymmetric fan nozzle configured to produce a non-uniform back pressure for the fan, wherein said non-axisymmetric fan nozzle has a first fan nozzle area at a first portion of said non-axisymmetric fan nozzle and a second fan nozzle area at a second portion of said non-axisymmetric fan nozzle, said first fan nozzle area being less than said second fan nozzle area and configured such that said first fan nozzle area and said second fan nozzle area are non-axisymmetric with respect to said longitudinal rotational axis wherein said first fan nozzle area is formed by at least one first flap having a first camber from a first flap leading edge to a first flap trailing edge which curves toward said longitudinal rotational axis and wherein said second fan nozzle area is formed by at least one second flap having a second camber from a second flap leading edge to a second flap trailing edge which curves away from said longitudinal rotational axis,
wherein said core exhaust nozzle is located downstream of both said first flap trailing edge and said second flap trailing edge, said first fan nozzle area is defined between said at least one first flap and a top surface of said core nacelle, and said second fan nozzle area is defined between said at least one second flap and a bottom surface of said core nacelle.

2. The fan section of claim 1, wherein said at least one first flap comprises a plurality of circumferential flaps and wherein said at least one second flap comprises a plurality of circumferential flaps.

3. The fan section of claim 1, wherein each one of said at least one first flap is attached to a rear portion of said fan nacelle and each one of said at least one second flap is attached to a rear portion of the surface of the fuselage.

4. The fan section of claim 1, wherein the first portion is a top portion of said non-axisymmetric fan nozzle and the second portion is a bottom portion of said non-axisymmetric fan nozzle.

5. The fan section of claim 2, wherein the first portion is a top portion of said non-axisymmetric fan nozzle and the second portion is a bottom portion of said non-axisymmetric fan nozzle.

6. An aircraft comprising the fan section of claim 1.

7. An aircraft comprising the fan section of claim 1, wherein the surface of the fuselage is adjacent to, or part of, a tail section of the fuselage of the aircraft.

8. The fan section of claim 1, wherein said first fan nozzle area has a first radial distance from said longitudinal rotational axis to said first flap trailing edge and said second fan nozzle area having a second radial distance from said longitudinal rotational axis to said second flap trailing edge, wherein said first radial distance is less than said second radial distance.

* * * * *